(12) United States Patent
Grahn et al.

(10) Patent No.: US 11,507,132 B2
(45) Date of Patent: Nov. 22, 2022

(54) CLOCK DRIFT DETERMINATION

(71) Applicant: Hitech & Development Wireless Sweden AB, Kista (SE)

(72) Inventors: Anders Grahn, Kista (SE); Pär Bergsten, Kista (SE)

(73) Assignee: HITECH & DEVELOPMENT WIRELESS SWEDEN AB, Kista (SE)

( * ) Notice: Subject to any disclaimer, the term of this patent is extended or adjusted under 35 U.S.C. 154(b) by 0 days.

(21) Appl. No.: 17/276,029

(22) PCT Filed: Sep. 13, 2019

(86) PCT No.: PCT/EP2019/074587
§ 371 (c)(1),
(2) Date: Mar. 12, 2021

(87) PCT Pub. No.: WO2020/053436
PCT Pub. Date: Mar. 19, 2020

(65) Prior Publication Data
US 2022/0057828 A1   Feb. 24, 2022

(30) Foreign Application Priority Data

Sep. 14, 2018  (EP) .................................... 18194572

(51) Int. Cl.
*G06F 1/08* (2006.01)
*G06F 1/10* (2006.01)
*G06F 1/12* (2006.01)

(52) U.S. Cl.
CPC .................. *G06F 1/12* (2013.01); *G06F 1/08* (2013.01); *G06F 1/10* (2013.01)

(58) Field of Classification Search
None
See application file for complete search history.

(56) References Cited

U.S. PATENT DOCUMENTS

| | | | |
|---|---|---|---|
| 9,356,931 B2 | 5/2016 | Ekman et al. | |
| 10,241,192 B1* | 3/2019 | Acton | G01S 5/06 |
| 10,659,679 B1* | 5/2020 | Beeler | G01S 5/14 |
| 2006/0080575 A1* | 4/2006 | Golparian | G06F 1/12 |
| | | | 714/12 |
| 2007/0257832 A1 | 11/2007 | Lommen | |
| 2010/0118858 A1 | 5/2010 | Pisharody | |
| 2010/0220748 A1* | 9/2010 | Inomata | G06F 1/12 |
| | | | 370/503 |
| 2016/0142481 A1* | 5/2016 | Castaneda | G06F 16/27 |
| | | | 709/217 |

(Continued)

OTHER PUBLICATIONS

International Search Report dated Dec. 11, 2019 for PCT International Application No. PCT/EP2019/074587.

(Continued)

*Primary Examiner* — Phil K Nguyen
(74) *Attorney, Agent, or Firm* — Volpe Koenig (57) ABSTRACT

A method for determining a clock drift comprises determining a drift of a clock relative to a reference clock based on two signals from the reference clock and a further signal. The method can be used for time synchronization and is suitable for implementation on resource-constrained devices. An anchor point implementing the method and a real-time locating system comprising such an anchor point are also disclosed.

16 Claims, 3 Drawing Sheets

(56) References Cited

U.S. PATENT DOCUMENTS

2017/0195109 A1* 7/2017 Perez-Cruz ............... G01S 5/06

OTHER PUBLICATIONS

Written Opinion of the International Searching Authority dated Mar. 19, 2020 for PCT International Application No. PCT/EP2019/074587.

Xue et al, "A Model on Indoor Localization System Based on the Time Difference Without Synchronization," IEEE Access, vol. 6 (2018).

* cited by examiner

|  | A | B |
|---|---|---|
| *tod[1]* | 0626424792 | 0626424792 |
| *toa[1]* | 1575819177 | 1575819177 |
| *tod[2]* | 0932300420 | 0932300420 |
| *toa[2]* | 1881715291 | 1881676373 |
| *offset[1]* | 0949394385 | 0949394385 |
| *offset[2]* | 0949414871 | 0949375953 |
| *toa[PING]* | 2693806168 | 2693740632 |
| *drift* | -18431 | 48937 |
| *inter* | 1744372866 | 1744413616 |
| *tof* | 4096 | 4096 |
| *rx[PING]* | 1744376962 | 1744417712 |

*Fig. 3*

CLOCK DRIFT DETERMINATION

TECHNICAL FIELD

The present invention relates to a method for determining a drift of a clock relative to a reference clock. The present invention also relates to an anchor point implementing the method and to a real-time locating system comprising such an anchor point.

BACKGROUND

Real-time locating systems are used in a wide variety of indoor and outdoor applications where it is desired to track the location of objects and people in real time. Examples of applications include tracking components through a production line, and quickly locating merchandise in a warehouse and medical instruments in a hospital. Such systems may also be used for monitoring access to restricted areas in a building and for increasing the safety of workers in hazardous environments, such as oil refineries and mines.

A typical real-time locating systems includes so-called tags, which are attached to the objects to be tracked. The tags send out wireless signals to make their positions known. In applications where the objects move in a confined area, indoors and/or outdoors, the signals from the tags are received by receivers, often referred to as anchors, arranged at fixed, known locations within the area, such as on the walls of a building. The anchors send wireless signals, which include information about the signals they receive from the tags, to a remote server which then determines the positions of the tracked objects.

The positions of the tags are typically derived using the fact that a signal emitted by a tag is received by different anchors at different times. A Time Difference of Arrival (TDoA) method is often used. In such methods, inconsistencies between the clocks of the anchors may lead to errors in the positions. A conventional way of addressing this issue is to let one of the anchors serve as a reference timekeeper which sends reference timestamps to the other anchors. The other anchors forward each reference time stamp to the server, each time including a timestamp of their own in the forwarding signal. The server then adjusts the anchor's timestamps to the reference timestamp when calculating the position of the tag. A problem with this approach is that, since the anchors must send both their own timestamp and the reference timestamp, the amount of traffic in the network and the load on the server are increased.

SUMMARY

An objective of the present invention is to provide an improved or alternative solution for determining clock drift.

According to a first aspect of the present invention, there is presented a method for determining a drift of a clock relative to a reference clock, the method being suitable for implementation in a real-time locating system comprising the reference clock and an anchor point, the anchor point comprising the clock and being configured to receive wireless signals emitted from an object tracked by the real-time locating system, the method comprising the steps of:

receiving, by the anchor point, a first reference signal emitted from the reference clock, the first reference signal being a wireless signal and comprising a first departure time, the first departure time being indicative of a time when the first reference signal is emitted according to the reference clock;

determining, by the anchor point, a first arrival time indicative of a time when the first reference signal is received according to the clock;

receiving, by the anchor point, a second reference signal emitted by the reference clock, the second reference signal being a wireless signal and comprising a second departure time, the second departure time being indicative of a time when the second reference signal is emitted according to the reference clock;

determining, by the anchor point, a second arrival time, the second arrival time being indicative of a time when the second reference signal is received according to the clock;

receiving, by the anchor point, a further signal, the further signal being a wireless signal emitted from the object;

determining, by the anchor point, a further arrival time indicative of a time when the further signal is received according to the clock; and determining, by the anchor point, the drift based on the first departure time, the second departure time, the first arrival time, the second arrival time and the further arrival time, the drift being an estimate of how much the clock has drifted relative to the reference clock between the second arrival time and the further arrival time.

The first and second reference signals may be, but does not have to be, two consecutive signals emitted by the reference clock.

The drift results from the reference clock and the clock of the anchor not running at exactly the same speed. The method according to the first aspect of the invention is based on the realization that, with a judiciously chosen a set of input data, i.e. the further signal and the reference signals above, it is possible to estimate a clock drift relative to a reference clock in a highly efficient manner. The estimated clock drift can then be used to compensate for the differences in time between the clocks caused by the drift.

The method according to the first aspect of the invention is highly efficient, something which makes it particularly suitable for implementation on resource-constrained devices, such as the anchor points of a real-time locating system, and the method therefore provides cost benefits by keeping hardware requirements low.

When the method according to the first aspect of the invention is implemented in a real-time locating system, it is possible to keep the amount of data sent from the anchor points to the server low, because most, or all, of the computations to determine the clock drift can be performed by the anchor points. Thereby, the traffic in the network and the load on the server can be reduced.

It is noted, however, that the method according to the first aspect of the invention may advantageously be implemented in not only real-time locating systems, but also in other types of systems requiring determination of drifts of one or more clocks relative to a reference clock.

It is also noted that relative time in view of a reference clock is used to determine drift as opposed to using clock synchronization or time relative to an absolute clock. Since a relative time in view of a reference clock or master, i.e. in reference to a master beacon, may be determined, no clock synchronization to an absolute clock is needed.

The drift may be calculated from: a difference between the further arrival time and the second arrival time; a difference between the first arrival time and the second arrival time; and a difference between the first departure time and the second departure time.

The first departure time, the second departure time, the first arrival time, the second arrival time and the further arrival time may be represented as integers. The method according to the first aspect of the invention allows for the drift to be estimated with high precision using integers, something which helps to reduce hardware-requirements because computations based on integers are typically less resource-demanding than computations based on floating point numbers, such as computations based on Kalman filtering algorithms.

The method may comprise the steps of: determining, by the anchor point, an intermediate time based on the further arrival time, the second departure time, the second arrival time and the drift; and generating, by the anchor point, an output signal, the output signal being a wireless signal and indicative of the intermediate time. The intermediate time may be determined as a sum, the sum comprising the further arrival time, the second arrival time, the second departure time, and the drift. It is noted that the sum may include positive as well as negative terms.

The method may comprise a step of determining a synchronized time based on the further arrival time, the second departure time, the second arrival time, the drift and a time of flight between the anchor point and the reference clock. The time of flight is a measure of the time required for a reference signal to travel from its point of emission to its point of reception. The synchronized time may be determined as a sum comprising the intermediate time and the time of flight. Thus, once the drift has been determined, the times measured by the anchor point can be synchronized with a time measured by the reference clock in a particularly easy manner. By synchronizing a time measured by the anchor with a time measured by the reference clock is here meant to determine what time, according to the reference clock, the anchor point's time corresponds to.

The step of determining a synchronized time may be performed by the anchor point.

The real-time system may comprise a server configured to determine a position of the object and to communicate wirelessly with the anchor point, and the step of determining a synchronized time may be performed by the server.

The method may comprise the steps of: determining a first offset and a second offset, the first offset being based on the first departure time and the first arrival time, the second offset based on the second departure time and the second arrival time; comparing the first offset with the second offset; and determining that the first offset and the second offset differ by less than a predetermined threshold. The comparison is a way of checking whether the second reference signal has been disturbed in some way that makes it unsuitable for determining the drift. A disturbance may for example be caused by something that temporarily obstructs the path travelled by the signal.

The first offset value may be determined as a difference between the first departure time and the first arrival time, and the second offset value may be determined as a difference between the second departure time and the second arrival time.

According to a second aspect of the present inventions, there is presented an anchor point for a real-time locating system, the real-time locating system comprising a reference clock, the anchor point comprising a clock and being configured to:

receive a first reference signal emitted from the reference clock, the first reference signal being a wireless signal and comprising a first departure time, the first departure time being indicative of a time when the first reference signal is emitted according to the reference clock;

determine a first arrival time indicative of a time when the first reference signal is received according to the clock;

receive a second reference signal emitted by the reference clock, the second reference signal being a wireless signal and comprising a second departure time, the second departure time being indicative of a time when the second reference signal is emitted according to the reference clock;

determine a second arrival time, the second arrival time being indicative of a time when the second reference signal is received according to the clock;

receive a further signal, the further signal being a wireless signal emitted from the object;

determine a further arrival time indicative of a time when the further signal is received according to the anchor point; and determine a drift based on the first departure time, the second departure time, the first arrival time, the second arrival time and the further arrival time, the drift being an estimate of how much the clock has drifted relative to the reference clock between the second arrival time and the further arrival time.

It will be appreciated that the anchor point according to the second aspect of the present invention may provide for technical effects that are largely analogous to those of the method according to the first aspect of the invention.

The anchor point may be configured to calculate the drift using the first departure time, the second departure time, the first arrival time and the second arrival time represented as integers.

The anchor point may be configured to determine a synchronized time based on the further arrival time, the second departure time, the second arrival time, the drift and a time of flight between the anchor point and the reference clock.

The anchor point may be configured to: determine an intermediate time based on the further arrival time, the second departure time, the second arrival time and the drift; and generate an output signal, the output signal being a wireless signal and indicative of the intermediate time.

The anchor point may be configured to: determine a first offset and a second offset, the first offset being based on the first departure time and the first arrival time, the second offset based on the second departure time and the second arrival time; compare the first offset with the second offset; and determine that the first offset and the second offset differ by less than a predetermined threshold.

According to a third aspect of the present invention, there is presented a real-time locating system, comprising:

a tag intended to be arranged on an object to be tracked by the real-time locating system, the tag being configured to generate a wireless tag signal allowing determination of a position of the tag;

a reference clock configured to generate a wireless reference signal indicative of a departure time;

a server configured for wireless communication and to determine a position of the object; and at least one anchor point according to the second aspect of the present invention, the anchor point being configured for wireless communication with the tag, the reference clock and the server.

It will be appreciated that the real-time locating system according to the third aspect of the present invention may provide for technical effects that are largely analogous to those of the method according to the first aspect of the invention and the anchor point according to the second aspect of the invention.

The server may be configured to determine a synchronized time based on the intermediate time and a time of flight between the anchor point and the reference clock.

BRIEF DESCRIPTION OF THE DRAWINGS

The present invention will be described in more detail with reference to the appended drawings which show examples of embodiments of the present invention.

The figures are not drawn to scale. The sizes of layers and regions are exaggerated for illustrative purposes and, thus, are provided to illustrate the general structures of embodiments of the present invention.

DETAILED DESCRIPTION

The present invention will be described more fully hereinafter with reference to the accompanying drawings showing embodiments of the invention. The present invention may, however, be embodied in many different forms and should not be construed as limited to the embodiments set forth herein. Rather, these embodiments are provided for thoroughness and completeness, and fully convey the scope of the invention to a person skilled in the art.

Figure 1:
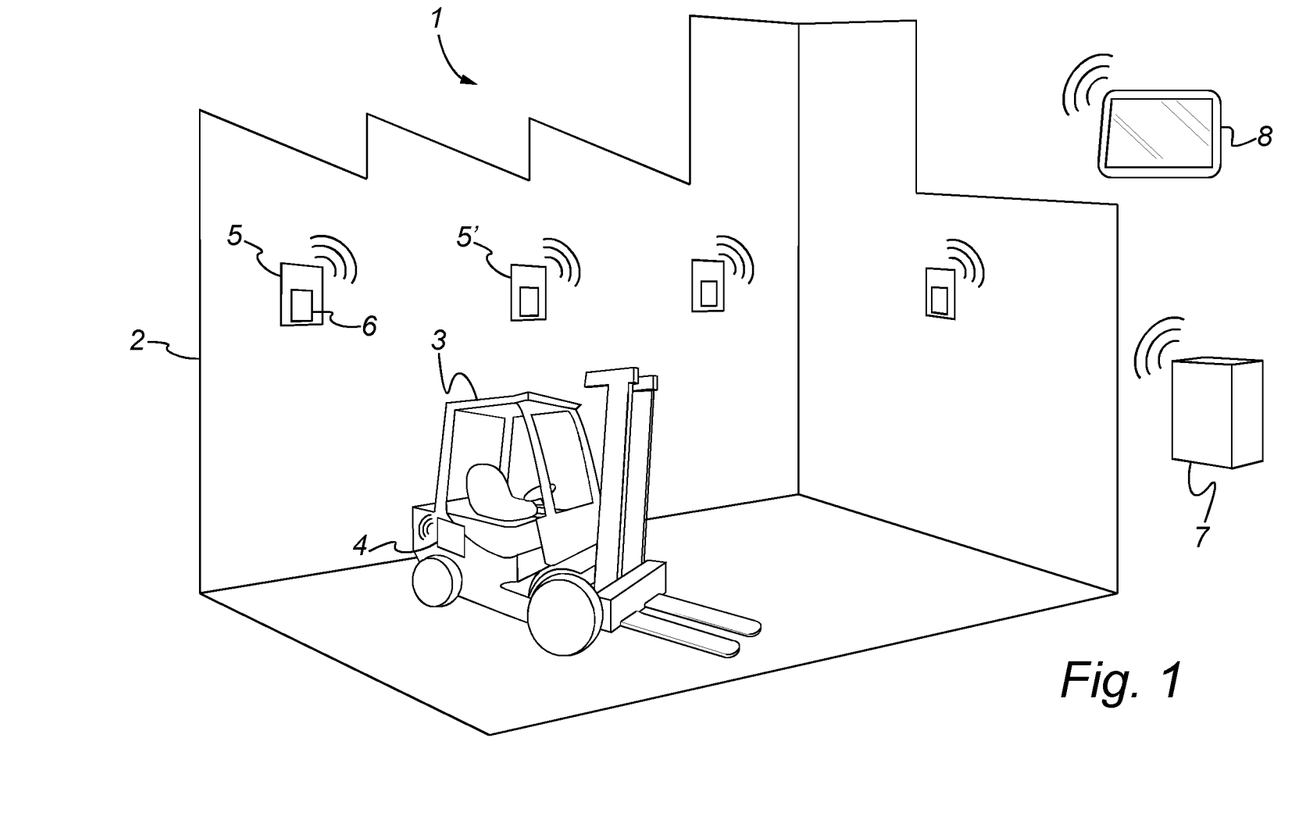
FIG. 1 illustrates schematically a real-time locating system according to an embodiment of the invention.

With reference to FIG. 1, a real-time locating system (RTLS) 1 according to an example embodiment of the invention will now be described. As will be clear from the discussion below, the RTLS 1 is an example of a wireless network comprising multiple nodes which communicate wirelessly with each other.

The RTLS 1 may be used to track virtually any type of objects, typical examples including boxes, pallets, returnable transport packages, various types of machines, medical instruments, etc. The RTLS 1 may also be used for tracking people. The objects, the positions of which are tracked by the RTLS 1, may or may not be of the same type. Further, the RTLS 1 may be configured to track the positions of the objects indoors, such as in factories, warehouses, hospitals, etc., as well as outdoors.

The RTLS 1 is in this case configured to track the position of objects within a predetermined zone 2, here a factory. For reasons of clarity, only one of the objects tracked by the RTLS 1 is illustrated in FIG. 1, viz. a forklift denoted by the reference numeral 3. The total number of objects tracked by the RTLS 1 is typically in the hundreds or in the thousands.

The RTLS 1 comprises tags, or mobile nodes, which are attached to the objects the positions of which are tracked by the RTLS 1. One tag is here attached to each object. All of the tags are in this case of the same type, and even though the following discussion will focus on the tag which is attached to the forklift 3 and denoted by the reference numeral 4, it will be appreciated that the discussion also applies, mutatis mutandis, to the other tags.

The tag 4 may for example be attached to the forklift 3 by mechanical means, such as pins or clamps, or by chemical means, such as glue or some other adhesive. The tag 4 is here attached to an outer side of the chassis of the forklift 3, but the tag 4 may of course be arranged elsewhere on the forklift 3 in a different example. The tag 4 here comprises a power source in the form of a battery (not shown).

The tag 4 is configured to generate wireless signals. Thus, the tag 4 is here a type of sender device. The wireless signals generated by the tags 4 are herein referred to as wireless tag signals or simply tag signals. The tag 4 is in this example configured to periodically send out a tag signal. The tag 4 is usually configured to send out a tag signal approximately every second. The frequency with which the tag signals are emitted may, however, be higher or lower in a different example. The higher the frequency, the better the precision with which the RTLS 1 can determine the positions of the tag 4 when the forklift 3 moves. However, the power consumption of the tag 4 typically increases with the frequency.

In this case, each tag signal sent out from the tag 4 comprises tag identity information and sequence data. The tag identity information is data indicating from which tag the tag signal was sent, here the tag 4 on the forklift 3. The sequence data is data indicating the position of the tag signal in the sequence of tag signals sent out by the tag 4. It should be noted that the tag signals may comprise additional data. For example, in some applications it may be advantageous to integrate one or more sensors with the tag 4, such as a thermometer and/or an accelerometer. In such case, the tag signal may include data from those sensors.

The tag signals are in this example ultra-wideband signals. However, the tag signals may be some other type of wireless signals in a different example, such as Wi-Fi signals, Bluetooth signals or Bluetooth low energy signals. Which wireless technology is chosen for a particular application depends on various factors, such as how much power the tag 4 should consume and how accurately the RTLS 1 should be able to locate the forklift 3.

The RTLS 1 in this case comprises several anchor points 5, which may be referred to as fixed nodes. The anchor points 5 will henceforth be referred to as anchors for brevity. The anchors 5 are here arranged at fixed positions inside the factory 2. More precisely, the anchors 5 are in this case arranged on the walls of the factory 2, although the anchors 5 may be arranged elsewhere, such as on the ceiling, in a different example. The anchors 5 are typically positioned approximately 15 meters to 20 meters from each other. In this case, each anchor 5 comprises a power source in the form of a battery (not shown).

The anchors 5 are here a type of wireless devices capable of receiving and generating wireless signals. Thus, the anchors 5 are a type of sender devices as well as receiver devices. Specifically, the anchors 5 are here configured to receive the tag signals emitted by the tag 4. Each anchor 5 comprises processing circuitry (not shown) capable of processing of the information included in the signals that the anchor 5 receives, including performing basic calculations.

The wireless signals generated by the anchors 5 will henceforth be referred to as anchor signals. The anchor signals are in this case Wi-Fi signals, although the anchor signals can be some other type of wireless signal in a different example, such as GSM signals or LTE signals. The anchor signals emitted by the anchors 5 here comprise information based on the information included in the received tag signals as well as additional information, as will be further discussed below. The anchors 5 may be configured to automatically send out anchor signals in a repeated manner or upon request by an external device, such as the server 8 (further discussed below).

Each anchor 5 is capable of keeping track of time. Specifically, each anchor 5 is here integrated with a clock 6 for keeping track of time. The clock may alternatively be referred to as a time-keeping device. The clocks 6 are capable of keeping time independently of each other. That is to say, each clock 6 keeps track of its "own" time. The clocks 6 are in this case hardware clocks.

The RTLS 1 comprises a reference clock. In this case, one of the anchors serves as the reference clock, more specifically the anchor which is denoted by the reference numeral 5' in FIG. 1. That is to say, the time kept by the clock of the anchor 5' is here used as a departure time. The anchor 5' will therefore be referred to as "the reference clock" in the following. It is noted that it is not necessary to use one of the anchors 5 as a reference clock. Thus, in a different example, the reference clock 5' may be some other type of device which is capable of keeping track of time and generating wireless signals.

The reference clock 5' is configured to generate wireless signals, henceforth referred to as reference signals. Each reference signal includes time information indicative of when, according to the according to the reference clock 5', the reference signal was emitted. The reference clock 5' is typically configured to emit a reference signal every 100 milliseconds to 200 milliseconds, such as every 150 milliseconds. The reference signals are in this case ultra-wideband signals, but may in a different example be some other type of signals, such as Wi-Fi signals, Bluetooth signals or Bluetooth low energy signals. The reference signals are intended to be received by the other anchors 5. Therefore, the reference clock 5' is here located at a location inside the factory 2 such that the reference signals can be received by all, or as many as possible, of the other anchors 5. Such a location may for example be a central location inside the factory 2.

As mentioned above, the RTLS 1 comprises a server 7, which may be referred to as a central node. The server 7 is in this case arranged remotely from the factory 2. However, in a different example, the server 7 may be arranged locally, such as inside the factory 2. The server 7 is configured to receive the anchor signals. Thus, the server 7 and the anchors 5 are configured to communicate wirelessly with each other, in this case via a Wi-Fi network. However, the server 7 and the anchors 5 may be configured to communicate over some other type of network, such as a GSM network or an LTE network, or a combination of networks. The communication between the anchors 5 and the server 7 may be secured, for example in the manner described in U.S. Pat. No. 9,356,931 issued to the present applicant. The server 7 may be configured to send requests for anchor signals to the anchors 5 or to receive the anchor signals sent out by the anchors 5, without sending requests therefor. The server 7 is typically communication technology agnostic, i.e. compatible with different ways of accessing a TCP/IP backbone network. The server 7 may be configured to access a TCP/IP backbone network via a wireless connection and/or via a wired connection.

The server 7 is in this case configured to process the information included in the anchor signals. Specifically, the server 7 is here configured to determine, based on the received anchor signals, the positions of the tag 4. The server 7 is here configured to determine the location of the tag 4 using a Time Difference of Arrival (TDoA) method. When determining the position of the tag 4, the server 7 here uses not only the information included in the anchor signals but also information that is pre-stored on the server 7, such as the positions of the anchors 5 and the reference clock 5'.

The server 7 is in this case configured to wirelessly transmit the determined position to an external device 8, such as a desktop, a laptop, a tablet computer or mobile phone. The external device 8 here comprises a display. Thereby, an operator can see, for example in real time, where the forklift 3 is located inside the factory 2. Further, the server 7 may be configured to evaluate the determined positon according to a set of rules and to generate a signal based on the evaluation. For example, the server 7 may be configured to send an alarm signal to an operator if the forklift 3 moves outside a particular zone. Still further, the server 7 may be configured to store the determined positions and to send them later to the external device 8.

In brief, the RTLS 1 operates as follows. The anchors 5 receive the tag signals and reference signals emitted by the tag 4 and the reference clock 5', respectively. It should be noted that all of the tag and reference signals are not necessarily received by every anchor 5 all the time, for example because of too long a distance between the forklift 3 and a particular anchor 5 or because something is temporarily blocking a signal's path. The anchors 5 send anchor signals to the server 7 which determines the positions of the tag 4. Since the tag 4 is arranged on the forklift 3, the server 7 thereby determines the location of the forklift 3 while it transports items back and forth inside the factory 2. The server 7 sends the determined positions to the external device 8 for operator visualization in real-time. In this case, the operator can see, on the display of the external device 8, where the forklift 3 is located in within a time delay of one second or a few seconds.

In order for the positions determined by the server 7 to be accurate, it is important to synchronize the times of the clocks 6 of the anchors 5. The manner in which the synchronization is performed will be explained below with reference to FIG. 2 and with continued reference to FIG. 1. To simplify the discussion, the focus will be on one of the anchors of the RTLS 1, i.e. the anchor denoted by the reference numeral 5 in FIG. 1. However, each one of the anchors of the RTLS 1 is configured to perform the steps S1 to S11 discussed below, and the server 7 performs the steps S12 and S13 discussed below for each of the tag signals that it receives from the other anchors in the RTLS 1 as well.

Figure 2:
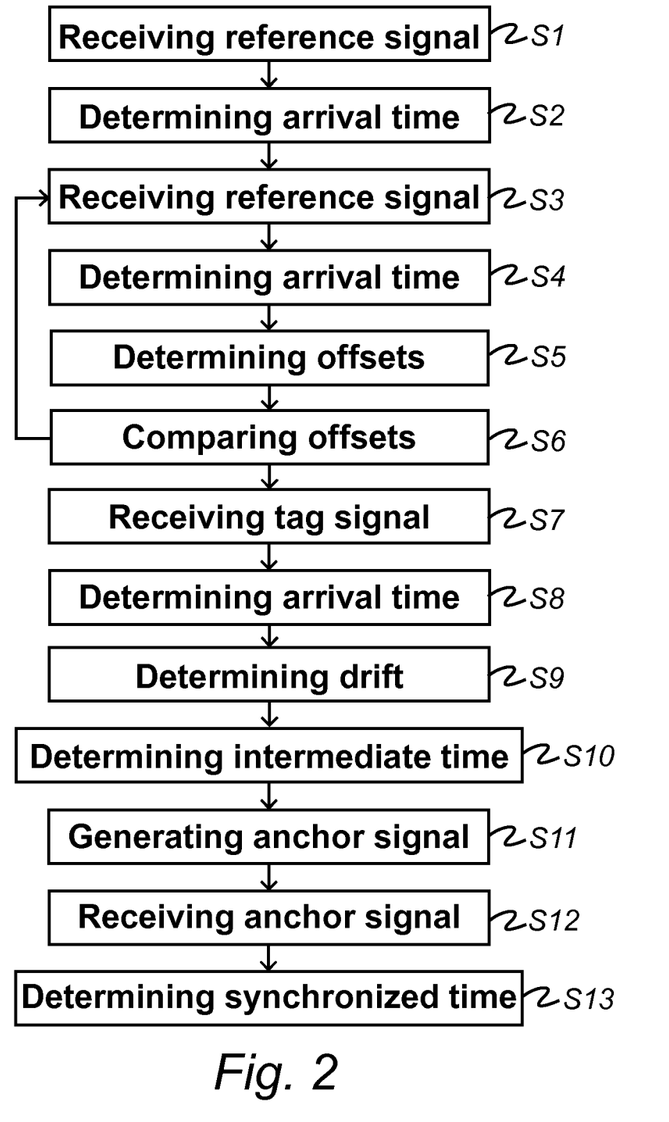
FIG. 2 shows a flowchart of a method for synchronizing times by determining a clock drift according to an embodiment of the present invention.

It is noted that the steps S1 to S9 below may be referred to as a method for determining a clock drift.

At a step S1, the anchor 5 receives a first reference signal. Specifically, the reference clock 5' emits a first reference signal indicative of a first departure time. The first departure time is in this case the time, according to the reference clock 5', when the first reference signal was emitted from the reference clock 5'. Differently stated, the first departure time is here the departure time, according to the reference clock 5', of the first reference signal. The anchor 5 stores the first departure time.

At a step S2, the anchor 5 determines a first arrival time indicative of the time when the first reference signal is received. Specifically, the first arrival time is in this case the time, according to the clock 6 of the anchor 5, when the anchor 5 receives the first reference signal. The anchor 5 stores the first arrival time.

At a step S3, the anchor 5 receives a second reference signal. Specifically, the reference clock 5' emits a second reference signal indicative of a second departure time. The second departure time is in this case the time, according to the reference clock 5', when the second reference signal was emitted from the reference clock 5'. Differently stated, the second departure time is here the departure time, according to the reference clock 5', of the second reference signal. The anchor 5 stores the second departure time.

It is noted that the second reference signal is in this case emitted by the reference clock 5' after the first reference signal. Specifically, the first and second reference signals are here consecutive signals.

At a step S4, the anchor 5 determines a second arrival time indicative of the time when the second reference signal is received. Specifically, the second arrival time is in this case the time, according to the clock 6 of the anchor 5, when the anchor 5 receives the second reference signal. The anchor 5 stores the second arrival time.

At an optional step S5, the anchor 5 determines a first offset and a second offset. The first offset is based on the first departure time and the first arrival time, and the second offset is based on the second departure time and the second arrival time. Specifically, the first offset is in this case computed as: offset[1]=toa[1]−tod[1], where offset[1] is the first offset, toa[1] is the first arrival time and tod[1] is the first departure time. Similarly, the second offset is in this case computed as: offset[2]=toa[2]−tod[2], where offset[2] is the second offset, toa[2] is the second arrival time and tod[2] is the second departure time.

At an optional step S6, the anchor 6 compares the first offset with the second offset. The comparison performed by the anchor 5 at step S6 is a way of checking whether the second reference signal has been disturbed in some way. For the sake of this discussion, it is assumed that the first reference signal was deemed not to have been disturbed in a previous comparison step, so that the first offset represents the offset of an undisturbed signal and, thus, constitutes an offset with which a meaningful comparison can be made.

If the comparison performed at step S6 shows that the first and second offsets differ by less than a predetermined threshold, the second reference signal is deemed not to have been disturbed. The steps S3 to S6 are then repeated, with the second signal "replacing" the first signal. The predetermined threshold is usually a couple of nanoseconds, such as approximately four nanoseconds.

If the comparison performed at step S6 shows that the first and second offsets differ by more than the predetermined threshold, the second departure time and the second arrival time will not be used for the purposes of clock drift determination and, in this case, time synchronization. The steps S3 to S6 are then repeated, without with the second signal "replacing" the first signal. Thus, if the second reference signal has been disturbed, the second departure time and the second arrival time are discarded and replaced by corresponding values derived from another signal from the reference clock 5'.

The above described loop is interrupted when the anchor 5 receives a tag signal. As mentioned above, the reference clock 5' typically emits reference signals more often than the tag 4 emits tag signals. The steps performed by the anchor 5 upon receipt of a tag signal will be discussed below. For the sake of the discussion, it will be assumed that the anchor 5 receives the tag signal after the second reference signal discussed above and that the comparison at step S6 showed that second reference signal had not been disturbed.

At a step S7, the anchor 5 receives a further signal, i.e. a tag signal. The tag signal is emitted from the forklift 3, or, more specifically, by the tag 4 which is arranged on the forklift 3. The further signal is here received by the anchor 5 after the second reference signal.

At a step S8, the anchor 5 determines a further arrival time indicative of the time when the anchor 5 receives the tag signal. Specifically, the further arrival time is in this case the time, according to the clock 6 of the anchor 5, when the anchor 5 receives the tag signal. The anchor 5 stores the further arrival time.

At a step S9, the anchor 5 determines a drift based on the first departure time, the second departure time, the first arrival time and the second arrival time and the further arrival time. The drift is here an estimate of a drift of the clock 6 of the anchor 5 relative to the reference clock 5' during the time interval between the further arrival time and the arrival time of the latest reference signal, which in this case is the second arrival time. The drift is in this case computed as: drift=−angle×delay, where angle=(toa[2]−toa[1]−tod[2]+tod[1])/(toa[2]−toa[1]), and delay=toa[PING]−toa[SYNC]. The further arrival time is here denoted by toa[PING] and toa[SYNC] is the arrival time of the latest reference signal. As noted above, the latest reference signal is in this case the second reference signal, so toa[SYNC]=toa[2].

It is in this example assumed that the reference clock 5' runs slower than the clock 6 of the anchor 5, so tod[2]−tod[1]<toa[2]−toa[1] and drift is negative.

At an optional step S10, an intermediate time is determined by the anchor 5. The intermediate time is in this case computed as: inter=toa[PING]−offset[SYNC]+drift, where inter is the intermediate time and offset[SYNC] is the offset of the latest reference signal, which in this case is the second reference signal. Hence, in this case offset[SYNC]=offset[2] determined at step S5.

It is noted that the steps S9 and S10 may be performed as a single step. It is also noted that performing the division at step S9 as late as possible helps to reduce rounding-off errors.

At an optional step S11, the anchor 5 generates an output signal, i.e. an anchor signal, indicative of the intermediate time. The anchor signal here also includes the tag identity information and sequence data included in the tag signal which the anchor 5 received at step S7. The anchor signal may also include other data, such as a received signal strength indicator (RSSI) indicative of the strength of the tag signal.

At an optional step S12, the server 7 receives the anchor signal.

At an optional step S13, the server 7 determines a synchronized time. Specifically, the synchronized time is in this case computed as: rx[PING]=inter+tof, where rx[PING] is the synchronized time, inter is the intermediate time computed at step S10, tof is the time of flight of a signal travelling from the reference clock 5' to the anchor 5. The term tof is in this case computed as tof=L/c, where c is the speed of light and L is the distance between the reference clock 5' and the anchor 5. The speed c and the distance L are here pre-stored in the server 7. The synchronized time represents the point in time, or a very good approximation thereof, when the anchor 5 received the tag signal according to the reference clock 5'.

It is noted that the step S12 may be performed by the anchor 5 instead of by the server 7. The time-of-flight value may in such case be pre-stored in the anchor 5. Thereby, the anchor 5 can compute the synchronized time. Of course, the time-of-flight values associated with two different anchors differ if the anchors are arranged at different distances from the reference clock 5'.

Further, it is appreciated that the step S13 may be seen as a step in which the synchronized time is "predicted" based on the latest departure time, here derived from the second reference signal, and the difference in speed between the reference clock 5' and the clock 6 of the anchor 5.

The server 7 receives anchor signals from all of the anchors. For each received anchor signal, the server 7 determines a synchronized time, each time using the corresponding time-of-flight. The synchronized times are then used in the TDoA method to determine the position of the tag 4.

Figure 3:
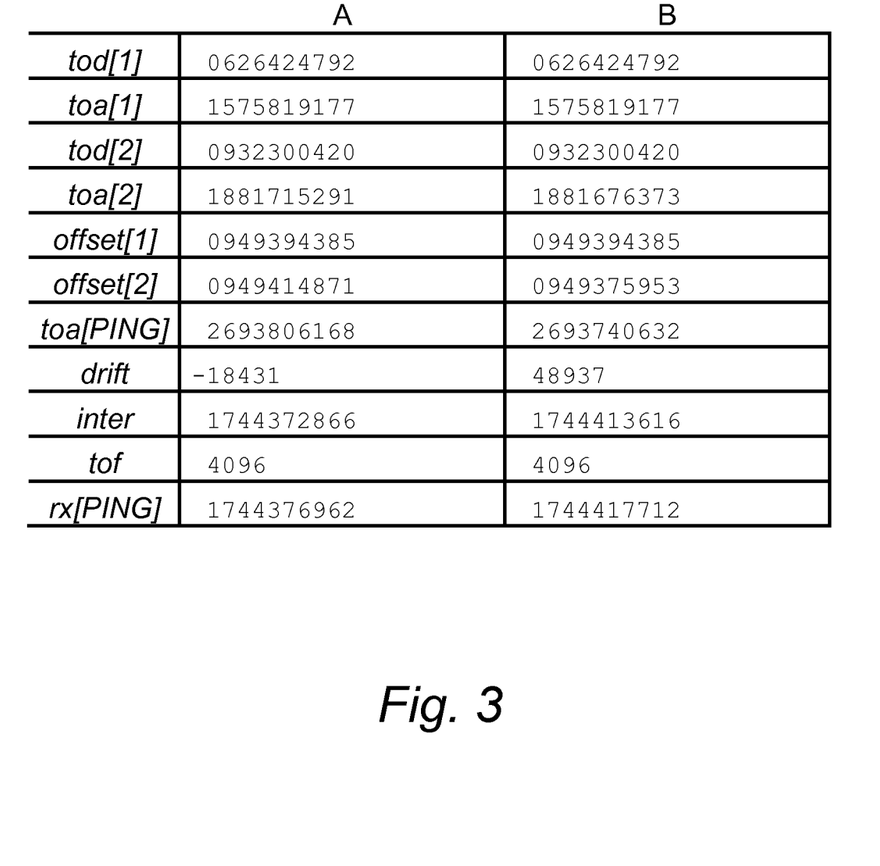
FIG. 3 shows a table.

FIG. 3 shows a table which lists some of the variables discussed above and their numerical values in two example situations. In example situation A, the reference clock 5' runs slower than the clock 6 of the anchor 5. In example situation B, the reference clock 5' runs faster than the clock 6 of the anchor 5. The numerical values are in this case integers.

The person skilled in the art realizes that the present invention by no means is limited to the embodiments described above. On the contrary, many modifications and variations are possible within the scope of the appended claims. For example, the method may be implemented in some other type of wireless network than an RTLS.

In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for determining a drift of a clock relative to a reference clock, the method being suitable for implementation in a real-time locating system comprising the reference clock and an anchor point, the anchor point comprising the clock and being configured to receive wireless signals emitted from an object tracked by the real-time locating system, the method comprising:
    receiving, by the anchor point, a first reference signal emitted from the reference clock, the first reference signal being a wireless signal and comprising a first departure time, the first departure time being indicative of a time when the first reference signal is emitted according to the reference clock;
    determining, by the anchor point, a first arrival time indicative of a time when the first reference signal is received according to the clock;
    receiving, by the anchor point, a second reference signal emitted by the reference clock, the second reference signal being a wireless signal and comprising a second departure time, the second departure time being indicative of a time when the second reference signal is emitted according to the reference clock;
    determining, by the anchor point, a second arrival time, the second arrival time being indicative of a time when the second reference signal is received according to the clock;
    receiving, by the anchor point, a further signal, the further signal being a wireless signal emitted from said object;
    determining, by the anchor point, a further arrival time indicative of a time when the further signal is received according to the clock; and
    determining, by the anchor point, the drift based on the first departure time, the second departure time, the first arrival time, the second arrival time and the further arrival time, the drift being an estimate of how much the clock has drifted relative to the reference clock between the second arrival time and the further arrival time.

2. The method according to claim 1, wherein the drift is calculated from:
    a difference between the further arrival time and the second arrival time;
    a difference between the first arrival time and the second arrival time; and
    a difference between the first departure time and the second departure time.

3. The method according to claim 1, wherein the first departure time, the second departure time, the first arrival time, the second arrival time and the further arrival time are represented as integers.

4. The method according to claim 1, further comprising:
    determining, by the anchor point, an intermediate time based on the further arrival time, the second departure time, the second arrival time and the drift; and
    generating, by the anchor point, an output signal, the output signal being a wireless signal and indicative of the intermediate time.

5. The method according to claim 1, wherein the method further comprises determining a synchronized time based on the further arrival time, the second departure time, the second arrival time, the drift and a time of flight between the anchor point and the reference clock.

6. The method according to claim 5, wherein the determining a synchronized time is performed by the anchor point.

7. The method according to claim 4, wherein the real-time system comprises a server configured to determine a position of said object and to communicate wirelessly with the anchor point, and wherein the determining a synchronized time is performed by the server.

8. The method according to claim 1, further comprising:
    determining a first offset and a second offset, the first offset being based on the first departure time and the first arrival time, the second offset based on the second departure time and the second arrival time;
    comparing the first offset with the second offset; and
    determining that the first offset and the second offset differ by less than a predetermined threshold.

9. The method according to claim 8, wherein the first offset value is determined as a difference between the first departure time and the first arrival time, and the second offset value is determined as a difference between the second departure time and the second arrival time.

10. An anchor point for a real-time locating system, the real-time locating system comprising a reference clock, the anchor point comprising a clock and being configured to:
    receive a first reference signal emitted from the reference clock, the first reference signal being a wireless signal and comprising a first departure time, the first departure time being indicative of a time when the first reference signal is emitted according to the reference clock;
    determine a first arrival time indicative of a time when the first reference signal is received according to the clock;
    receive a second reference signal emitted by the reference clock, the second reference signal being a wireless signal and comprising a second departure time, the second departure time being indicative of a time when the second reference signal is emitted according to the reference clock;
    determine a second arrival time, the second arrival time being indicative of a time when the second reference signal is received according to the clock;
    receive a further signal, the further signal being a wireless signal emitted from said object;
    determine a further arrival time indicative of a time when the further signal is received according to the anchor point; and
    determine a drift based on the first departure time, the second departure time, the first arrival time, the second arrival time and the further arrival time, the drift being an estimate of how much the clock has drifted relative to the reference clock between the second arrival time and the further arrival time.

11. The anchor point according to claim 10, wherein the anchor point is further configured to determine a synchronized time based on the further arrival time, the second departure time, the second arrival time, the drift and a time of flight between the anchor point and the reference clock.

12. The anchor point according claim 10, wherein the anchor point is further configured to:
   determine an intermediate time based on the further arrival time, the second departure time, the second arrival time and the drift; and
   generate an output signal, the output signal being a wireless signal and indicative of the intermediate time.

13. The anchor point according claim 10, wherein the anchor point is further configured to:
   determine a first offset and a second offset, the first offset being based on the first departure time and the first arrival time, the second offset based on the second departure time and the second arrival time;
   compare the first offset with the second offset; and
   determine that the first offset and the second offset differ by less than a predetermined threshold.

14. A real-time locating system, comprising:
   a tag intended to be arranged on an object to be tracked by the real-time locating system, the tag being configured to generate a wireless tag signal allowing determination of a position of the tag;
   a reference clock configured to generate a wireless reference signal indicative of a departure time;
   a server configured for wireless communication and to determine a position of said object; and
   at least one anchor point according to claim 10, the anchor point being configured for wireless communication with the tag, the reference clock and the server.

15. The real-time locating system according to claim 14, wherein the server is configured to determine a synchronized time based on the intermediate time and a time of flight between the anchor point and the reference clock.

16. The real-time locating system according to claim 14, wherein the tag signal is an ultra-wideband signal.

* * * * *